US006471236B2

(12) United States Patent
Eskridge (10) Patent No.: US 6,471,236 B2
(45) Date of Patent: Oct. 29, 2002

(54) MULTIMODE COLLAPSIBLE CART

(76) Inventor: Eugene C. Eskridge, 4580 Ellery Dr., Columbus, OH (US) 43227

( * ) Notice: Subject to any disclaimer, the term of this patent is extended or adjusted under 35 U.S.C. 154(b) by 0 days.

(21) Appl. No.: 09/845,598

(22) Filed: Apr. 30, 2001

(65) Prior Publication Data

US 2002/0011719 A1 Jan. 31, 2002

Related U.S. Application Data (63) Continuation-in-part of application No. 09/244,231, filed on Feb. 1, 1999, now abandoned.

(51) Int. Cl.$^7$ ................................................ B62B 11/00
(52) U.S. Cl. ........................ 280/648; 280/641; 280/651; 280/DIG. 4
(58) Field of Search ................................ 280/648, 641, 280/642, 643, 649, 650, 651, 652, 654, 35, 639, 31, 38, 47.18, 47.34, 47.16, DIG. 4; 248/214, 226.3; 224/42.03

(56) References Cited

U.S. PATENT DOCUMENTS

| | | | |
|---|---|---|---|
| 1,180,294 A | | 4/1916 | Hunter |
| 2,155,896 A | * | 4/1939 | Goldman ..................... 280/641 |
| 2,398,863 A | * | 4/1946 | Sides ......................... 280/641 |
| 2,407,385 A | * | 9/1946 | Rubin et al. ................. 280/641 |
| 2,451,985 A | * | 10/1948 | Sldes ......................... 280/641 |
| 2,471,004 A | | 5/1949 | Moster |
| 2,492,676 A | * | 12/1949 | Zajicek ....................... 280/641 |
| 2,506,319 A | | 5/1950 | Paul |
| 2,544,220 A | * | 3/1951 | Concklin .................... 280/641 |
| 2,564,939 A | | 8/1951 | Weast |
| 2,733,930 A | * | 2/1956 | Putterman ................... 280/641 |
| 3,094,339 A | * | 6/1963 | Hurvitz ....................... 280/31 |
| 3,168,328 A | | 2/1965 | Hill, Sr. |
| 3,191,956 A | * | 6/1965 | Rizzuto ....................... 280/641 |
| 3,388,920 A | | 6/1968 | Hill, Sr. et al. |
| 3,706,460 A | | 12/1972 | Thomas |
| 3,774,929 A | * | 11/1973 | Stanley ....................... 280/641 |
| 3,931,985 A | | 1/1976 | Knebel |
| 4,055,357 A | * | 10/1977 | Sorocin ...................... 280/641 |
| 4,199,170 A | | 4/1980 | Hubner et al. |
| 5,236,066 A | | 8/1993 | O'Neal et al. |
| 5,464,237 A | | 11/1995 | Saporiti |

FOREIGN PATENT DOCUMENTS

| CH | 659219 | * | 7/1985 | ................. 280/641 |
|---|---|---|---|---|

\* cited by examiner

Primary Examiner—Brian L. Johnson
Assistant Examiner—Hau Phan
(74) Attorney, Agent, or Firm—Sean M. Casey (57) ABSTRACT

A multipurpose materiel handling cart is disclosed for transporting food and other personal items from store to home, laundry, medium sized shelf items in stock rooms, and other portable objects used in a wide variety of residential and commercial environments. More specifically, the multimode cart for transporting items across a surface is described, which includes a substantially rigid and generally planar frame that is formed with a handle and oppositely disposed main wheels. The cart also incorporates a generally planar base assembly that is connected to the frame by an articulation assembly. The articulation assembly moves between a nested position, that is substantially coplanar with the frame, and an extended position that is generally orthogonal with the frame. The base assembly further includes an interconnection assembly that is disposed about the base assembly, and auxiliary wheels adapted to cooperate with the main wheels when the cart is in the extended position. Lastly, the cart includes a material handling adapter that is releasably attached by the interconnection assembly to the cart. The material handling adapter can preferably be any of a variety of interchangeable devices and adapters including, for example, a collapsible carrier basket, a rigid basket, a handtruck adapter, a flat bed carrier, a nursery tray, a pallet, an assembly jig, a dunnage rack, an engine stand, a postal tray, an office mail tray, a veterinary gurney, a medical device carrier, a phlebotomy sample tray, and a dumbwaiter. A detachable nose rail and a braking system are also described.

12 Claims, 10 Drawing Sheets

MULTIMODE COLLAPSIBLE CART

This application is a continuation-in-part of U.S. patent application Ser. No. 09/244,231, filed Feb. 1, 1999 now abandoned.

FIELD OF INVENTION

This invention relates to a multipurpose, multimode collapsible cart that incorporates a detachable material handling adapter or carrier that is configured to operate in nested vertical and extended horizontal positions to transport and enable access to movable goods and similar items.

DESCRIPTION OF PRIOR ART

Every day billions of dollars in merchandise and small personal items are moved by carts from one place to another in the home or commercial environment. While efforts have been made to provide a cart to meet the diverse transport needs, few have met the challenge.

The present invention relates to a maneuverable multi-purpose and multimode folding cart that provides the user a transport vehicle that can be used in both residential or business settings. There has been previously proposed various types of two-way or multiconfigurable shopping carts, such as those shown in U.S. Pat. No. 3,168,328 to Leslie F. Hill Sr. , and the Foldable Two-Way Shopping Cart of U.S. Pat. No. 3,388,920, issued Jun. 28, 1968 to Leslie F. Hill, Sr., and Eugene C. Eskridge. The typical basket-like carriers have a main wall that is lowermost in the vertical position of the carrier, and side wall extending from the opposite sides of the main wall. Further, the known carrier has two doors hinged to the edge of the side walls remote from the main panel to close the front end of the carrier in its vertical position and to permit access to the carrier from above in the horizontal position, and an end door hingingly mounted between the ends of the side walls which are uppermost in the vertical position to permit access to the carrier from above in such a position to close the back of the carrier in the vertical position. The first known two-way shopping cart can not be collapsed so that, even when it is in its contracted position, a relatively large space is required for storage of the cart. The second cart provided a collapsible basket, however folding and/or collapsing was complicated and presented a safety challenge because it had no braking system for making the cart immobile when necessary. Parts are difficult to construct and assemble thus making it labor intensive and costly to produce.

What has been needed but heretofor unavailable is a multipurpose and multimode folding cart that includes safe and convenient collapsibility for compact storage, and reconfigurability for use with a wide variety of materiel handling capabilities. A new and improved multimode cart has been needed that can be used not only as shopping cart for grocery stores, but which can also be reconfigured without undue expense or inconvenience to be compatible for use in other consumer, home, retail, and commercial material handling operations without the need to purchase an additional cart. Additionally, what has been wholly absent from the prior art is a cart that offers these features and which is also capable of handling light or heavy loads.

The present invention was developed in order to overcome prior disadvantages of prior devices and to the offer solutions to the needs that remain in the industry by providing a multipurpose and multimode folding cart that requires fewer steps to operate, less cost to manufacture, which requires less storage space, and which offers a wide array of reconfigurable options to the user.

SUMMARY OF THE INVENTION

To meet the needs that exist in the art, a multipurpose materiel handling cart is disclosed that is compatible for use in transporting a wide variety of materiel including, for example, food and other personal items from store to home, laundry, medium sized shelf items in stock rooms, and other portable objects used in a wide variety of residential and commercial environments. More specifically, the inventive multimode cart for transporting items across a surface is configured with a substantially rigid and generally planar frame. The frame is formed with a handle at one end and main wheels disposed about an opposite end.

The cart also incorporates a generally planar base assembly, which is connected to the frame by an articulation assembly. Preferably, the articulation assembly is movable between a nested position and an extended position. The nested position configures the base to preferably be substantially coplanar with the frame, and can be used in a generally vertical orientation with respect to the surface. In the extended position, the base is arranged to be generally orthogonal with the frame and preferably horizontal relative to the surface. The base assembly further includes an interconnection assembly disposed about the base assembly. Auxiliary wheels are also included, which are adapted to cooperate with the main wheels when the cart is in the extended position.

Lastly, the cart includes a material handling adapter. The adapter is releasably attached by the interconnection assembly to the cart. The material handling adapter is any of a number of integrally, detachably, or releasably mounted and interchangeable attachments or adapters including, for example without limitation, a collapsible carrier basket, a rigid basket, a handtruck adapter, a flat bed carrier, an agricultural nursery tray, a pallet, an assembly jig, a dunnage rack, an engine stand, a postal tray, an office mail tray, a veterinary gurney, a medical device carrier, a hospital nursery carrier, a phlebotomy sample tray, and a dumbwaiter. The present invention is also directed to variations that include detachable nose rail and a braking system, which are further described hereinbelow.

In modifications to the preceding embodiments, the detachable nose rail is preferably formed from a generally U-shaped rail that is adapted to attach to the base assembly. The nose rail is operable in the extended position to support a nose basket or similar carrier device for transporting additional items therein. In the nested configuration, the nose rail supports the multimode cart against the surface during loading, unloading, and storage of the cart.

In further preferred variations of the embodiments already described, the multimode cart incorporates a brake assembly that includes at least one actuatable friction pad adapted to engage at least one of the main wheels to, when actuated, prevent rotation. In alternative variations of the braking system, the brake assembly includes at least one slidable brake rod attached to the frame and wherein at least one of the main wheels is formed with at least one slot adapted to receive the rod to prevent rotation of at least one of the wheels.

Another variation of any of the preceding embodiments contemplates a multi-mode cart with an interconnection system that further incorporates a plurality of clips and attachment recesses that are disposed about the base assembly and adapted to permanently, releasably, or detachably engage the material handling adapter.

In another modification to any of the preceding configurations, the capture device is formed to include a handle at one end and a latch at an opposite end. In this variation, the frame further includes a grapple that is adapted to be captured by the latch to retain the base assembly in the nested position relative to the frame.

These and other features of this invention will become apparent to those skilled in the art upon consideration of the accompanying specification in combination with the drawing, and claims.

DESCRIPTION OF THE DRAWINGS AND FIGURES

Without limiting the scope of the present invention as claimed below and referring now to the drawings and figures, wherein like reference numerals across the several drawings, figures, and views refer to identical, corresponding, or equivalent elements, features, and parts:

DETAILED DESCRIPTION OF THE INVENTION

With reference now to FIGS. 1–10, a multimode cart for transporting items across a surface according to the present invention is shown. The cart is designated generally by reference numeral 100 and incorporates substantially rigid and generally planar frame 120. The frame 120 is formed from any of a variety of suitable metal tubings, including, for example without limitation, steel tubing, and to have a handle 130 at one end and main wheels 140 disposed about an opposite end.

The cart 100 also includes a generally planar base assembly 150, which is connected to the frame 120 by an articulation assembly 160. The articulation assembly 160 may further preferably incorporate a pivot cage 170 carried from one or more scissor bars 180, 190, and more preferably from scissor bar 180. A sliding pivot 200 is also preferably incorporated into the articulation assembly 160 and is received in the pivot cage 170. As can be best understood with specific reference to FIGS. 8 and 10, in combination with the other figures, the articulation assembly 160 also further preferably incorporates end slide couplings 210, 220, which are slidable along portions of frame 120 as the cart 100 is reconfigured between nested and extended modes. In this configuration, the cart 100, by operation of the articulation assembly 160, is movable between a nested position (see, for example, FIGS. 2, 3, 9, and 10) and an extended position (see, for example, FIGS. 1 and 4–8). In the nested position, the base 150 is preferably substantially coplanar with the frame 120. In this arrangement, the cart 100 can be used in a generally vertical orientation with respect to the surface on which the cart is used. In the extended position, the base 150 is configured to be generally orthogonal relative to the frame 120, and preferably horizontal relative to the surface. During reconfiguration between the nested and extended modes, the sliding pivot 200 slides and rotates within pivot cage 170 as the scissor bars 180, 190 pivot about pivot joint 230.

The articulation assembly 160 also preferably includes one or more auxiliary wheels 235, which are mounted from an end of scissor bar 180 and adapted to cooperate with the main wheels 140 the cart 100 is in either the extended or nested position, or both. Additionally, by adapting the respective lengths and configurations of the scissor bars 180, 190, the auxiliary wheels may be adapted to cooperate with the main wheels 140 when the cart 100 is in the nested position to stabilize the cart 100 for free-standing stability upon the surface during loading, unloading, the storage of the cart 100.

A capture device 240 is also slidably carried by the base assembly 150 and adapted to releasably retain the base 150 in the nested position and to latch to the frame 120. The capture device 240 may be spring-biased in the latched position (not shown in the figures) and is preferably formed with a handle 260 at one end and at an opposite end a latch 250 at one end adapted to releasably engage a grapple 270 formed in the frame 120.

In variations of any of the preceding configurations and modifications, a brake assembly 280 may be preferably attached to the frame 120 proximate to at least one of the main wheels 140 or auxiliary wheels 235 and operative to releasably engage at least one of the wheels to prevent rotation. The brake assembly 280 further may incorporate a foot-actuatable pivoting mechanism such as brake pivot 285 that, on actuation in the direction generally designated by arrows identified with reference letter "A", pivots the brake shear pin 290 into an interference relationship with the spokes, slots, or similar device formed in the main wheels 140 to prevent rotation. In alternative arrangements, the brake shear pin 290 may be slidably received, as generally illustrated by arrows designated with reference letter "B", into a recess formed in frame 120 proximate to one or more of the wheels 140 to similarly prevent rotation thereof. In another variation of any of the preceding configurations, the brake assembly 280 may incorporate one or more actuatable friction pads (not shown but well known to those with skill in the art) adapted to engage at least one of the main wheels 140, auxiliary wheels 235, or both, to when actuated, prevent rotation thereof.

A detachable nose rail 300 may also be detachably carried from the base assembly 150 and is preferably formed from a generally U-shaped rail 310. The nose rail 300 is adapted for use in the extended position of the cart 100 as a carrier rail for a basket, such as basket 320 for carrying additional items, and in the nested position as a stabilizer bar 310. In the latter, nested arrangement, the bar 310 cooperates with the main wheels 140, the auxiliary wheels 235, or both, to further stabilize the cart 100 for free-standing, hands-free capability.

The base assembly 150 further incorporates an interconnection assembly 340 that is disposed about the base assembly 150. The interconnection assembly 340 further includes a plurality of clips, such as, for example without limitation, clips 350, and attachment recesses 360 (FIG. 10) disposed about the base assembly 150 and adapted to releasably engage a material handling adapter, which is described in more detail below. Although shown in the various figures to be clips 350 that are attached to the base 150 by screws 355, any of a wide variety of more convenient, releasable and permanent fastening devices are equally suitable for purposes of the present invention. More over, a device similar to the capture device 240 may be similarly incorporated to facilitate convenient and more efficient detachability by the interconnection assembly 340.

The cart 100 also preferably includes a material handling adapter 400, such as a collapsible carrier basket 410 or a hand truck adapter 420 having a back support 422 and a toe plate 425. The latter hand truck adapter is particularly suited for material handling applications with the cart 100 in the nested and generally vertical configuration. The former collapsible carrier basket 410 is particularly well-suited for applications with the cart 100 in the extended and generally horizontal position. The material handling adapter 400 is releasably attached by the interconnection assembly 340 to the cart 100. The material handling adapter 400 can preferably be any of a number of integrally, detachably, or releasably mounted and interchangeable attachments or adapters including, for purposes of illustration but not limitation, a collapsible basket, a rigid basket, a handtruck adapter, a flat bed carrier, an agricultural nursery tray, a pallet, an assembly jig, a dunnage rack, an engine stand, a postal tray, an office mail tray, a veterinary gurney, a medical device carrier, a hospital nursery carrier, a phlebotomy sample tray, and a dumbwaiter (many of which are not shown in the various figures but which are known to those with skill in the art. As can be understood with respect to the various figures and specifically to FIGS. 3 and 8, in combination with the various other figures, the collapsible carrier basket 410 may also be used as a flat bed adapter.

Figure 1:
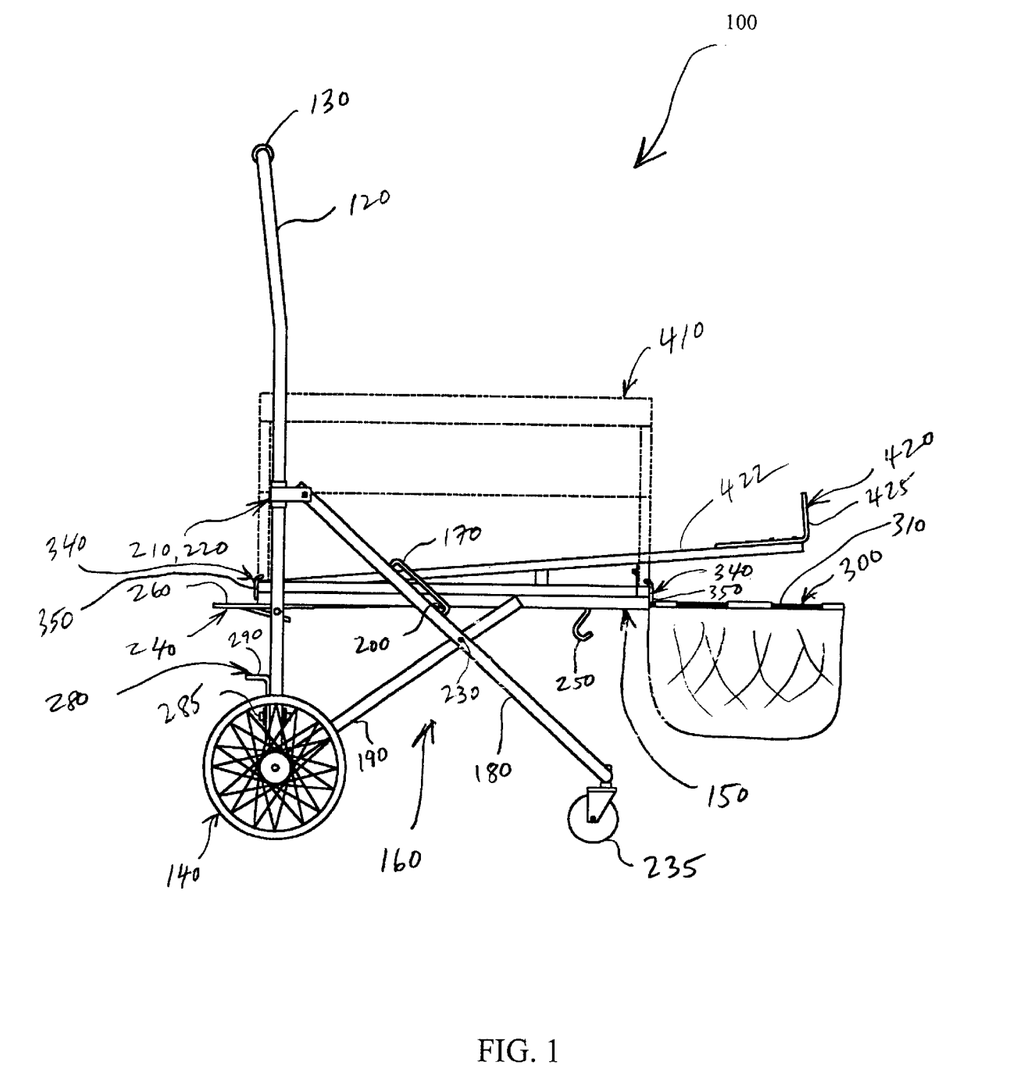
FIG. 1 is a side view, in reduced scale, of the multipurpose and multimode folding cart in an extended mode of the instant invention with some structure shown in phantom for illustration purposes.
Figure 2:
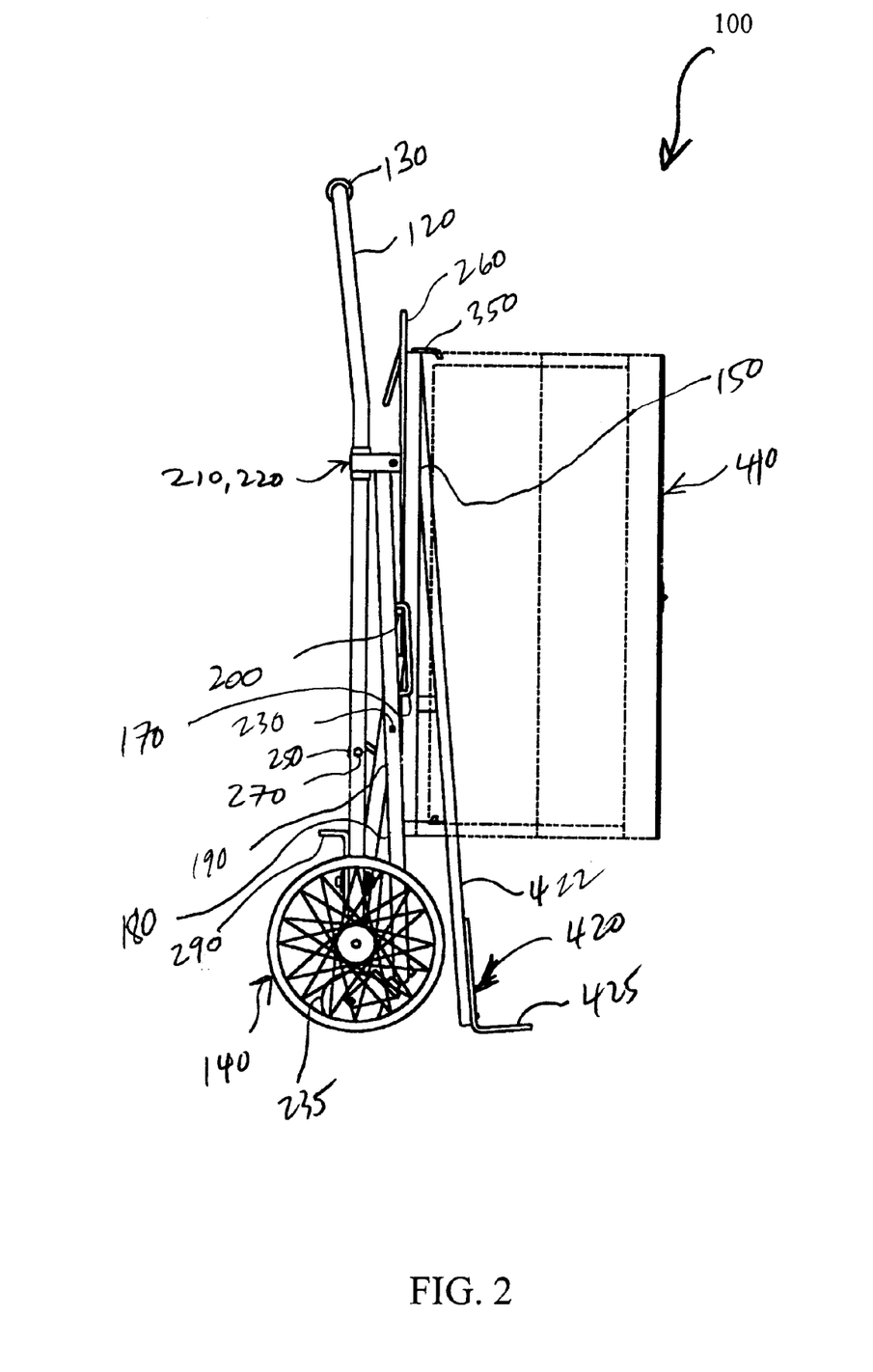
FIG. 2 is a side view of the multimode folding cart of FIG. 1 in a nested mode with some structure shown in phantom for illustration purposes.
Figure 3:
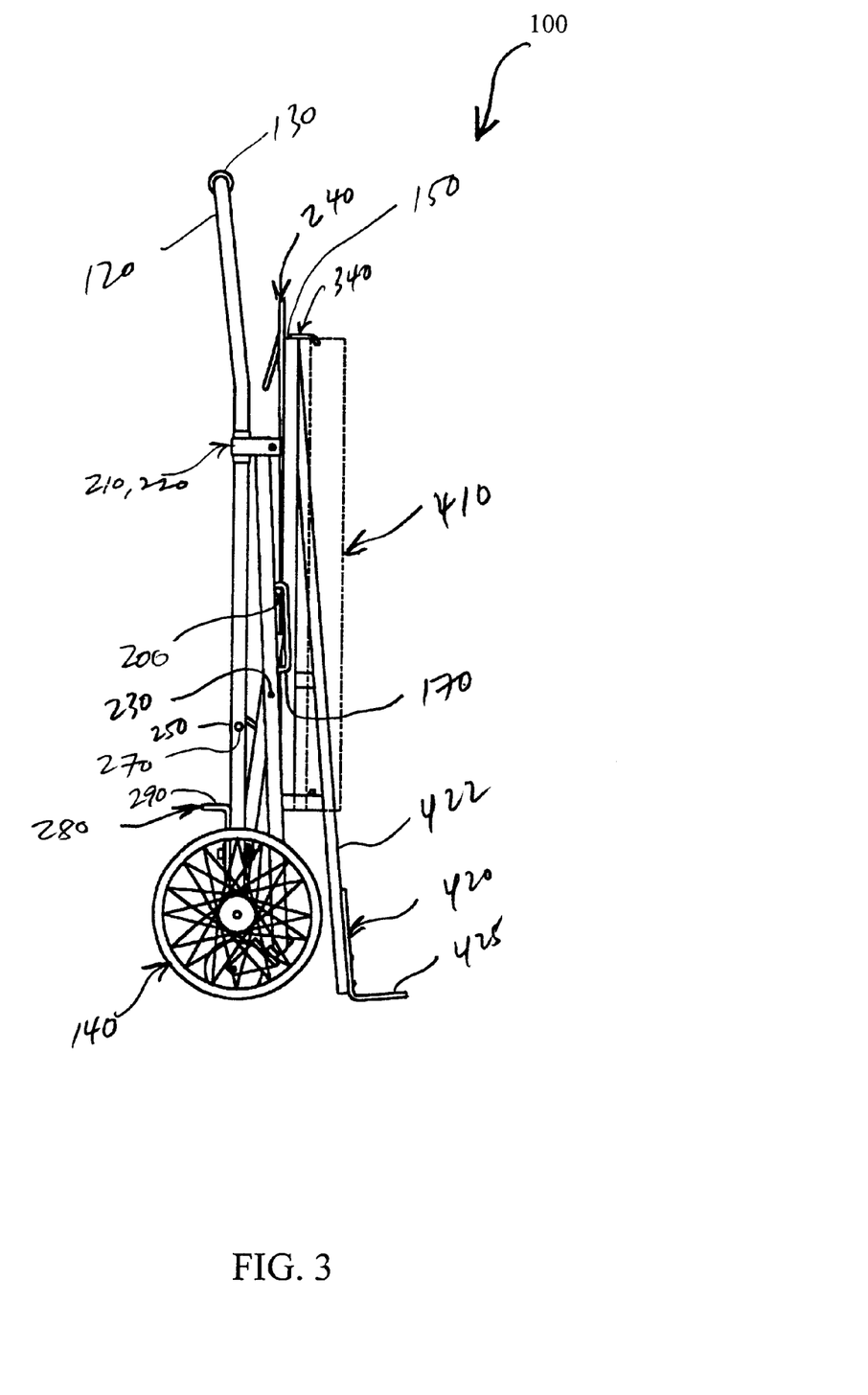
FIG. 3 is a side view of the multimode folding cart of FIG. 2 with some structure shown reconfigured and in phantom for illustration purposes.
Figure 4:
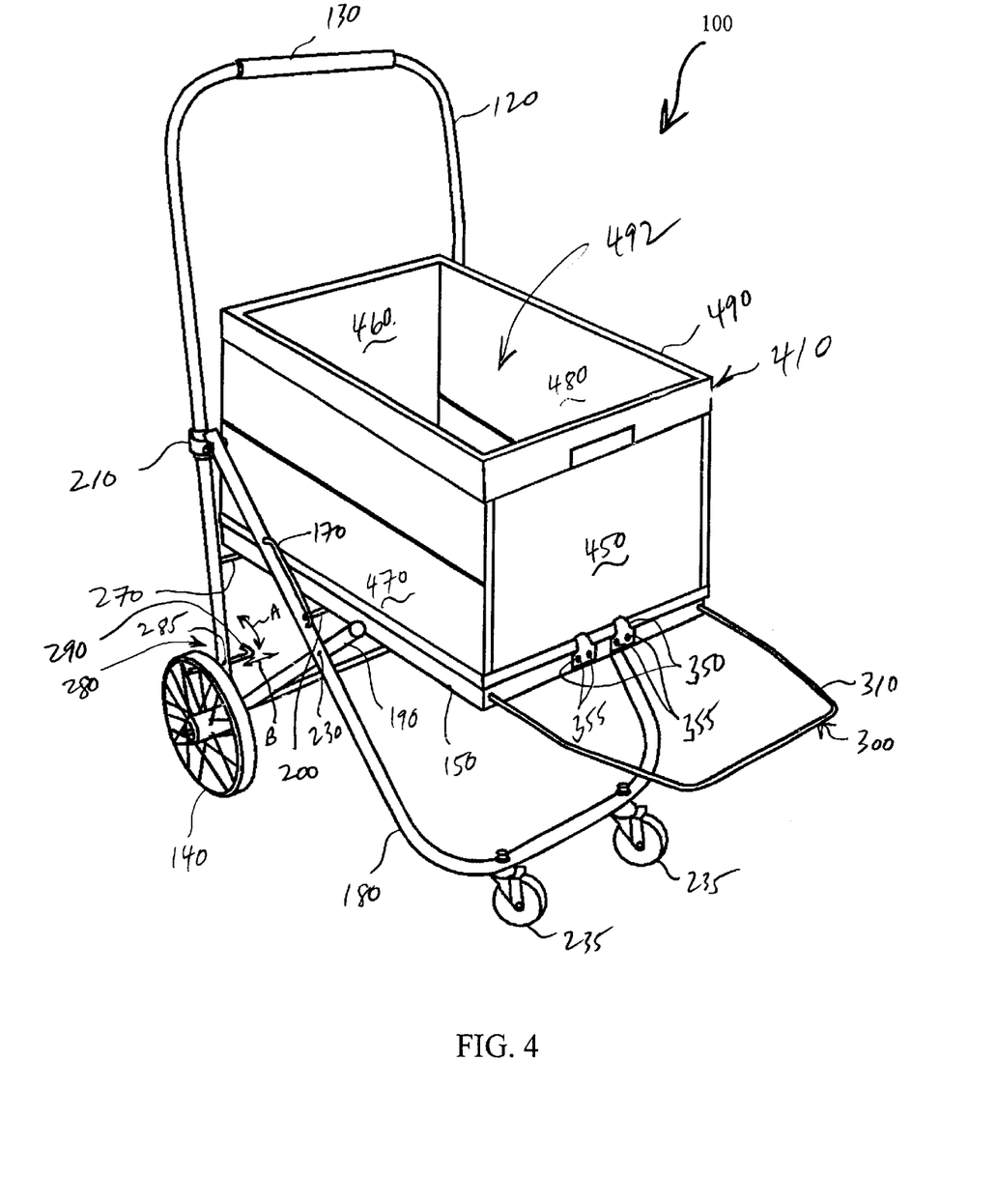
FIG. 4 is an elevated perspective view, in reduced scale and rotated, of the multimode folding cart of FIG. 1.
Figure 5:
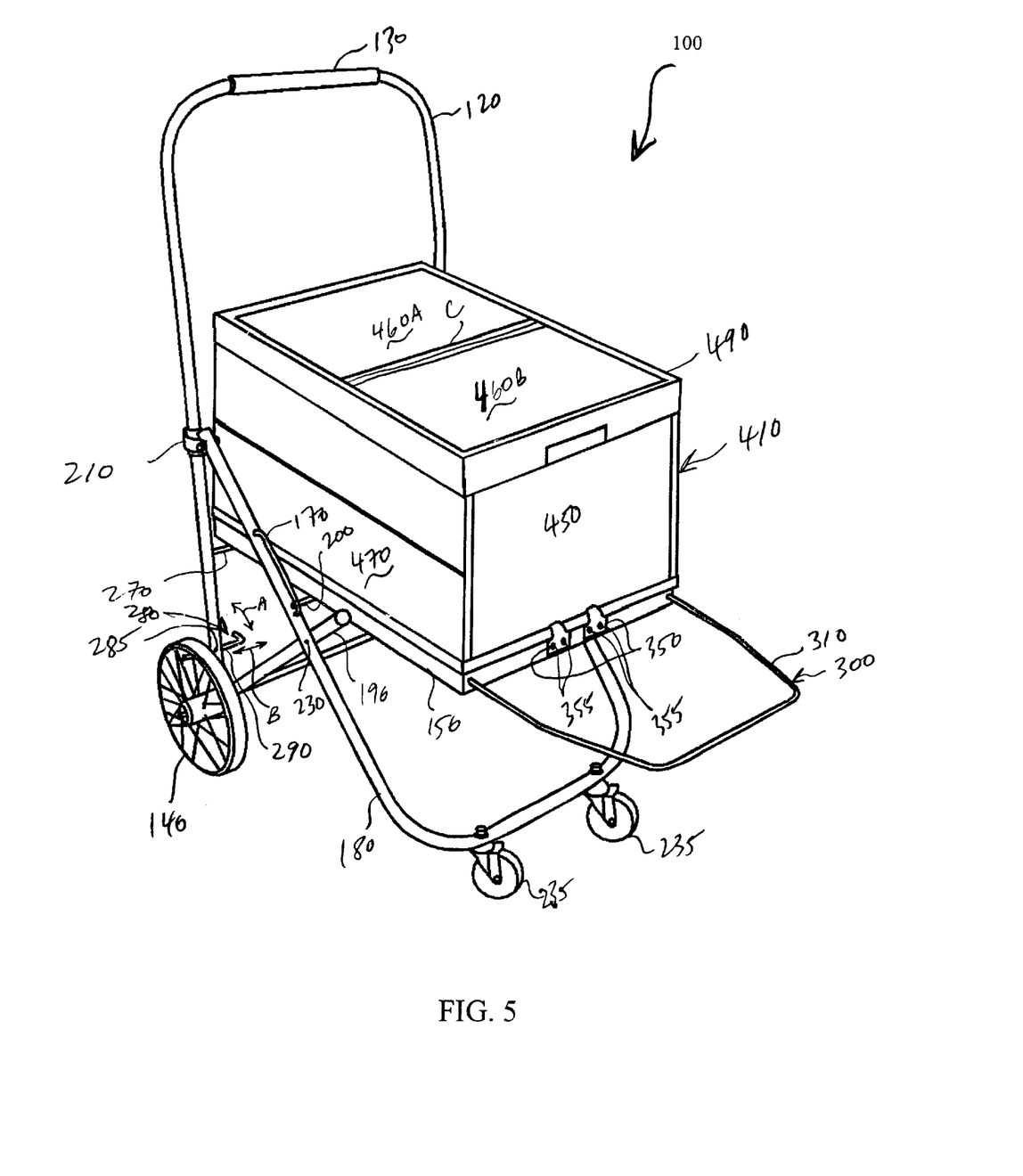
FIG. 5 is an elevated perspective view of the multimode folding cart of FIG. 4 with some structure shown in a reconfigured arrangement.
Figure 6:
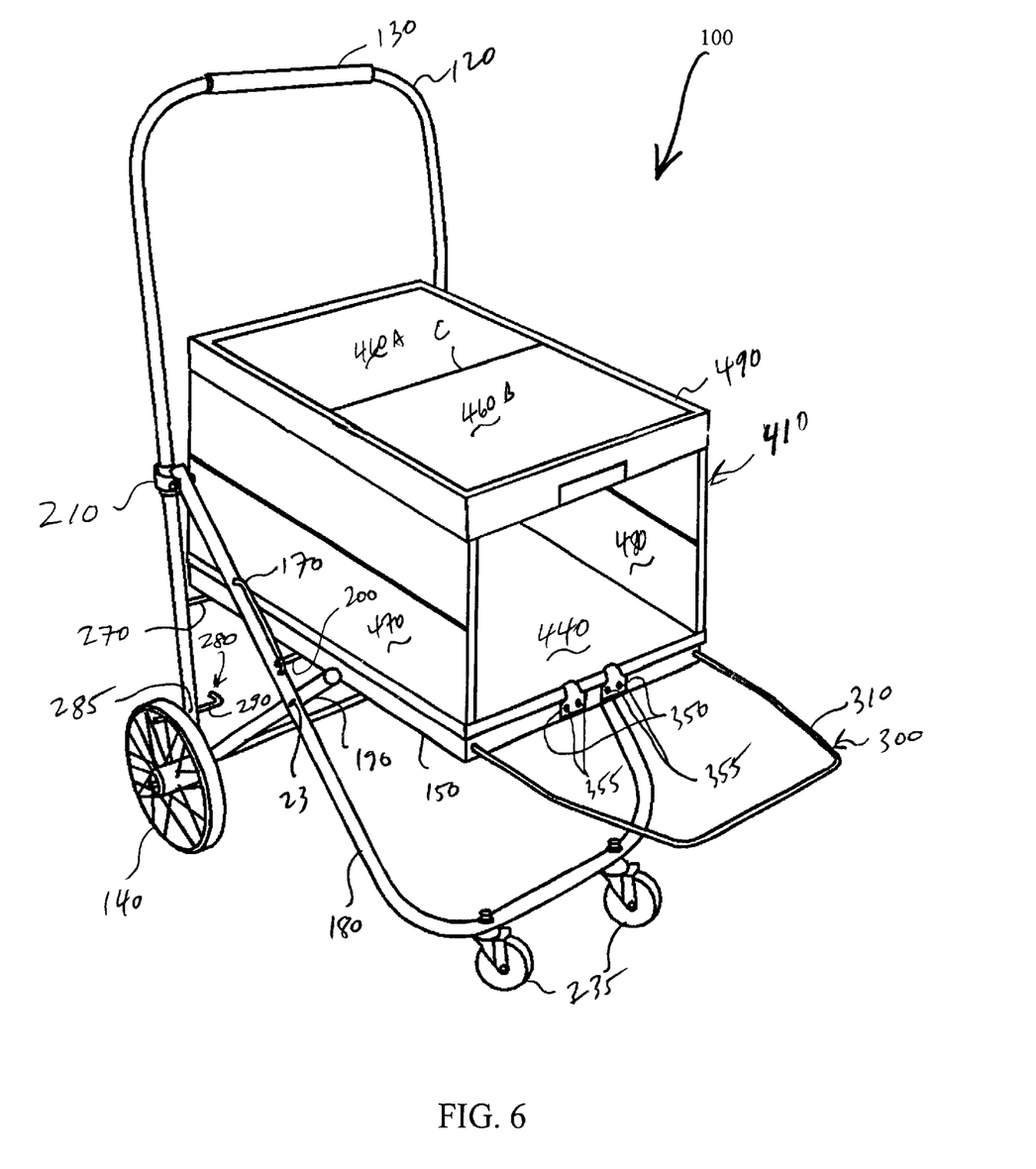
FIG. 6 is an elevated perspective view of the multimode folding cart of FIG. 5 with some structure shown in a reconfigured arrangement.
Figure 7:
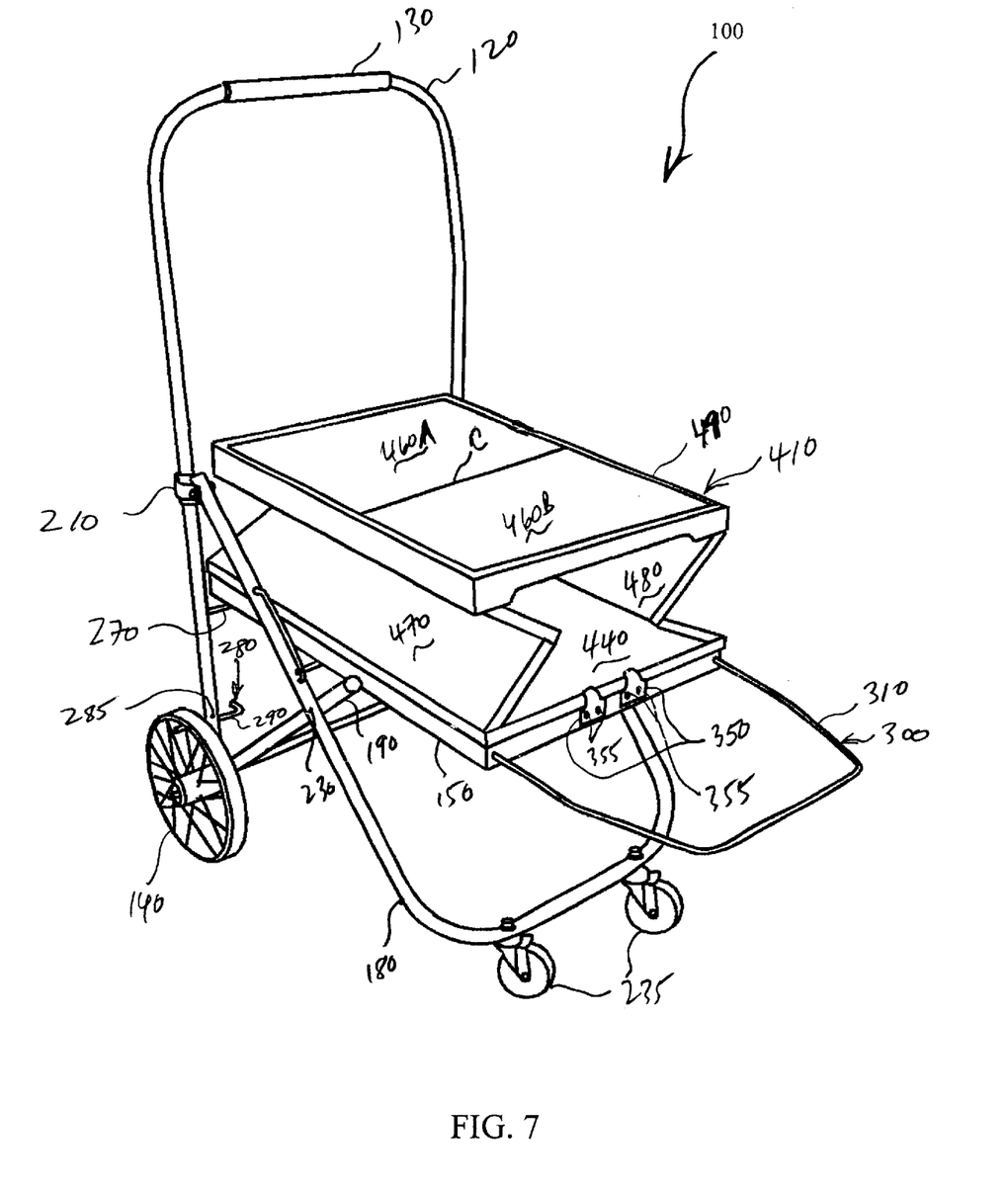
FIG. 7 is an elevated perspective view of the multimode folding cart of FIG. 5 with some structure shown in a reconfigured arrangement.
Figure 8:
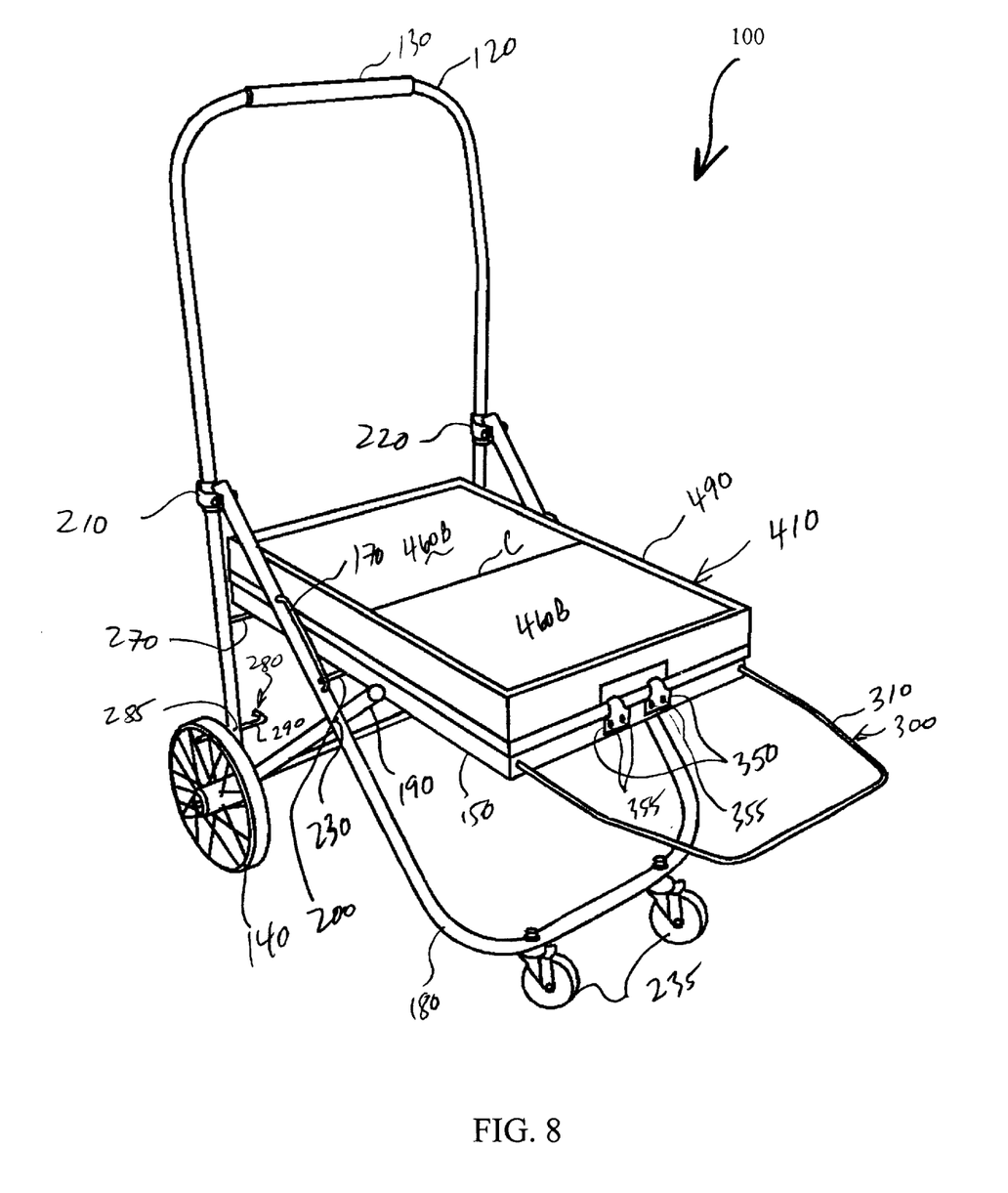
FIG. 8 is an elevated perspective view of the multimode folding cart of FIG. 5 with some structure shown in a reconfigured arrangement.
Figure 9:
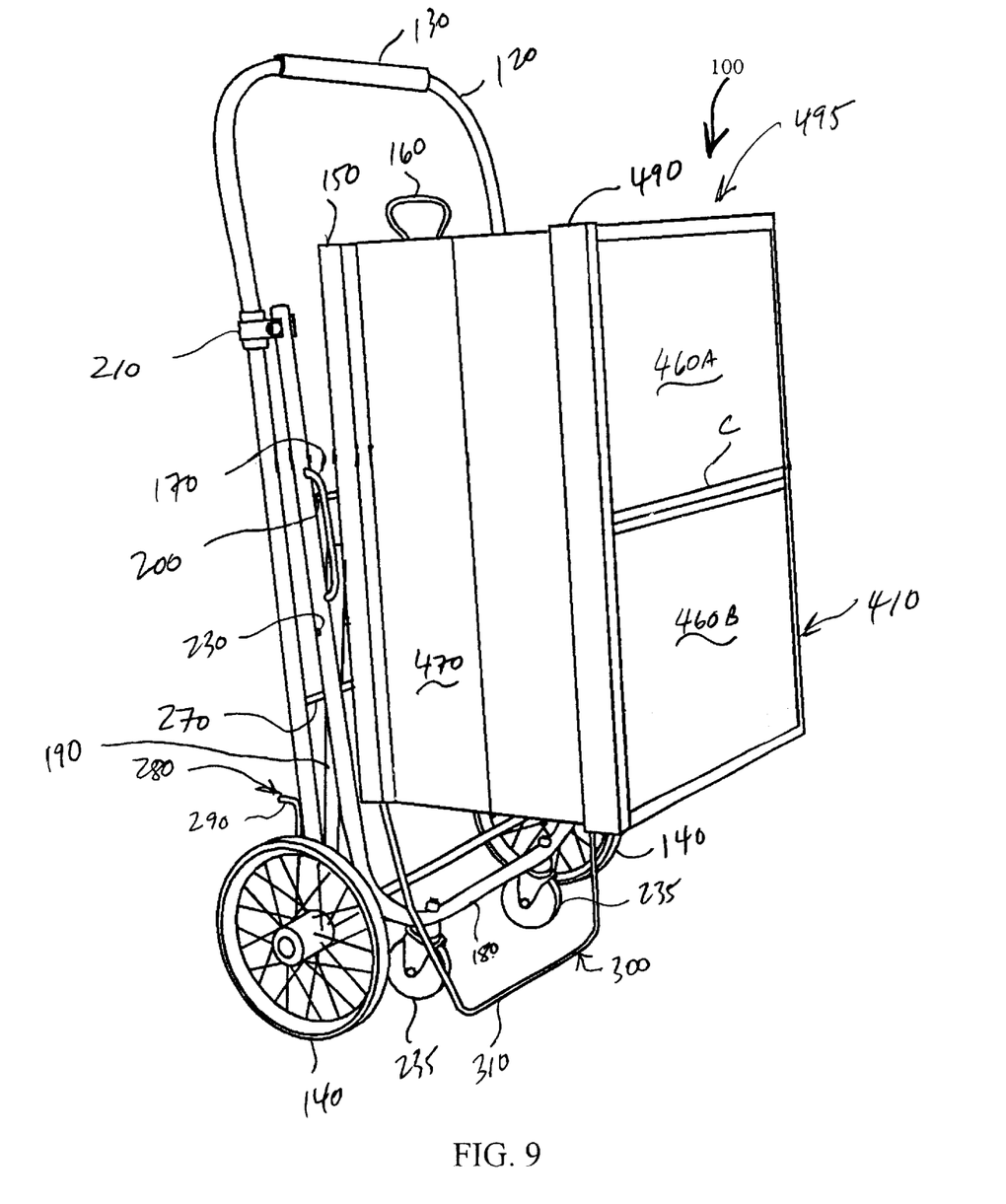
FIG. 9 is an elevated perspective view, in reduced scale and rotated, of the multimode folding cart of FIG. 2 with some structure shown in a reconfigured arrangement.
Figure 10:
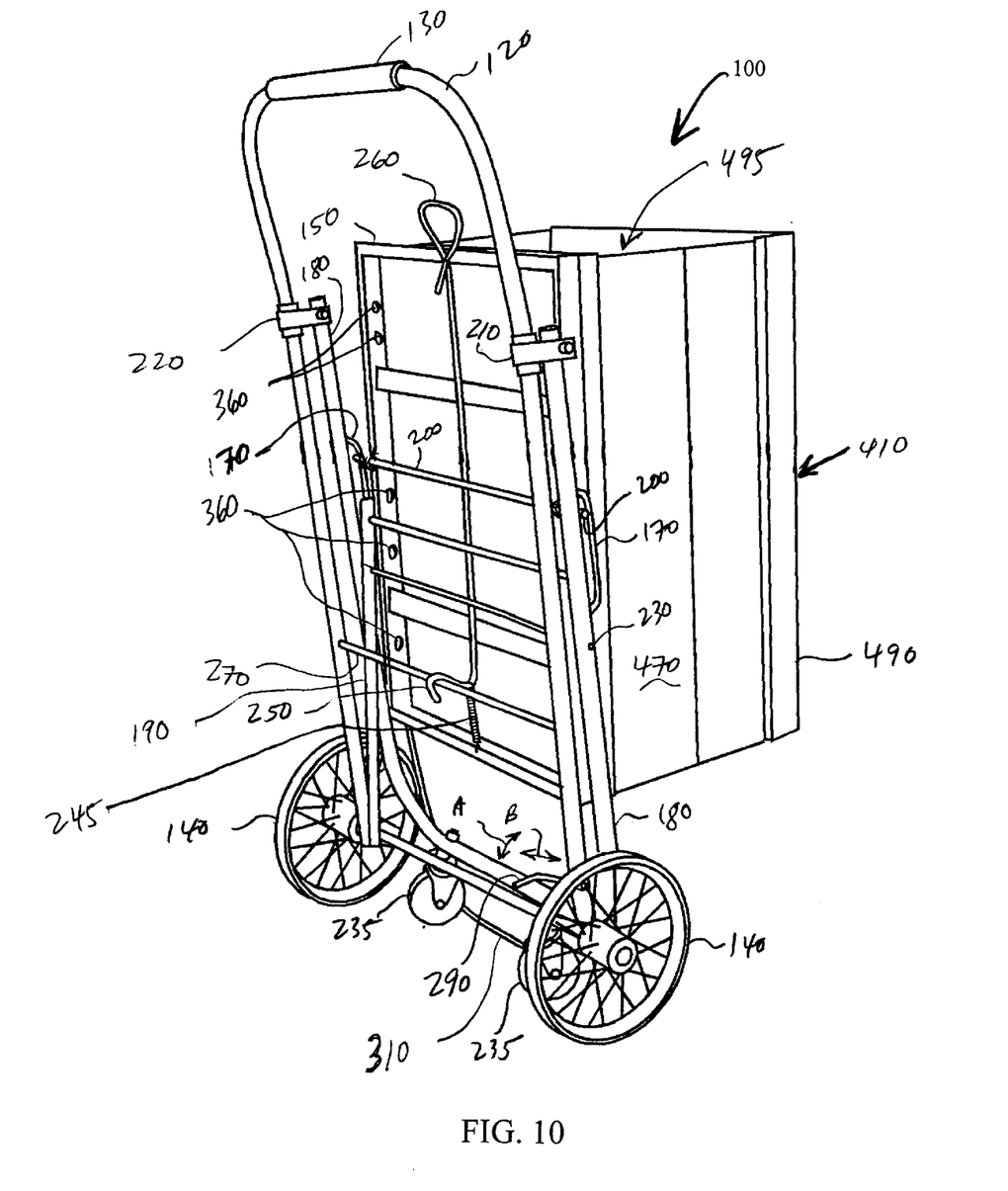
FIG. 10 is an elevated perspective view, in reduced scale and rotated, of the multimode folding cart of FIG. 2 with some structure shown in a reconfigured arrangement.

As a further description of the type of material handling adapters that are suitable for use with the present invention, the collapsible carrier basket 410 is shown most clearly in FIGS. 4 through 8 in its fully expanded (FIG. 4), fully collapsed (FIG. 8), and intermediate configurations. In its most preferably arrangement, the collapsible carrier basket 410 includes a bottom floor 440, and four upstanding walls: pivotable front wall 450, foldable and pivoting folding back wall 460, and collapsible folding side walls 470 and 480. The walls 450, 460, 470, and 480 are all pivotally connected to wall retainer 490, which forms a recess 492 that is useful for receiving items when cart 100 is in the extended position. Collapsible folding side walls 470 and 480 are pivotally connected to bottom floor 440 and front and back walls 450, 460 are detachably engaged with bottom floor 440. During operation of collapsible carrier basket 410, pivoting folding back wall 460 is unfolding from its position as shown in FIG. 4 so that panels 460A and 460B are unfolding along a planar joint designated generally by reference letter "C". With reference to FIGS. 9 and 10, it can be understood that the collapsible carrier basket 410 may be used in a generally vertical orientation since the pivoting and unfolding of pivoting folding back wall 460 creates recess 495, which is useful for receiving items when cart 100 is in the nested position.

Numerous alternatives, alterations, modifications, and variations of the preferred embodiments disclosed herein will be apparent to those skilled in the art and they are all contemplated to be within the spirit and scope of the instant invention. For example, although specific embodiments have been described in detail, those with skill in the art will understand that the preceding embodiments and variations can be modified to incorporate various types of substitute and/or additional materials, relative arrangement of elements, and dimensional configurations for compatibility with the wide variety of material handling applications and environments, and with compatible, interchangeable material handling adapters 400 and related equipment that is readily available to those in the art.

Accordingly, even though only few embodiments, alternatives, modifications, and variations of the present invention are described herein, it is to be understood that the practice of such additional modifications and variations and the equivalents thereof, are within the spirit and scope of the invention as defined in the following claims.

I claim:

1. A multimode cart for transporting items across a surface, comprising:
    a substantially rigid and generally planar frame formed with a handle and oppositely disposed main wheels and a pivot cage therebetween;
    a brake assembly attached to the frame proximate to at least one of the wheels and operative to releasbly engage at least one of the wheels to prevent rotation;
    a generally planar base assembly connected to the frame with a sliding pivot received in the pivot cage, an articulating scissor bar, and end slide couplings at the upper end of the scissor bar, the base assembly adapted to move thereby between a nested position substantially coplanar with the frame and an extended position generally orthogonal with the frame, the base assembly including an interconnection assembly disposed about the base assembly and at one end auxiliary wheels adapted to cooperate with the main wheels;
    a capture device slidably carried by the base assembly and adapted latch to the frame when in the nested position; and
    a material handling adapter releasably attached to the cart by the interconnect assembly.

2. A multimode cart according to claim 1, further comprising:
    a detachable nose rail formed from a generally U-shaped rail adapted to attach to the base assembly.

3. A multimode cart according to claim 1, wherein the brake assembly includes at least one actuatable friction pad adapted to engage at least one of the main wheels to, when actuated, prevent rotation thereof.

4. A multimode cart according to claim 1, wherein the brake assembly includes at least one slidable brake rod attached to the frame and wherein at least one of the main wheels is formed with at least one slot adapted to receive the rod to, when actuated, prevent rotation of at least one of the wheels.

5. A multimode cart according to claim 1, wherein the interconnection assembly further includes a plurality of clips and attachment recesses disposed about the base assembly and adapted to releasably engage the material handling adapter.

6. A multimode cart according to claim 1, wherein the capture device further incorporates a handle at one end and an opposite latch and wherein the frame further incorporates a grapple adapted to be captured by the latch to retain the base assembly in the nested position relative to the frame.

7. A multimode cart for transporting items across a surface, comprising:
- a substantially rigid and generally planar frame formed with a handle and oppositely disposed main wheels and a pivot cage therebetween;
- a brake assembly attached to the frame proximate to the wheels that includes at least one actuatable friction pad adapted to engage at least one of the wheels, when actuated, prevent rotation thereof;
- a capture device slidably carried by the base assembly and adapted to releaseably latch to the frame when in the nested position;
- wherein the capture device incorporates a handle at one end and an opposite latch and wherein the frame further incorporates a handle at one end and an opposite latch and wherein the frame further incorporates a grapple adapted to be adapted to be captured by the latch to retain the base assembly in the nested relative to the frame;
- a generally planar base assembly connected to the frame with a sliding pivot received in the pivot cage, an articulating scissor bar, and end slide couplings at the upper end of the scissor bar, the assembly adapted to move thereby between a nested position substantially coplanar with the frame and an extended position generally orthogonal with the frame, the base assembly including an interconnection assembly disposed about the base assembly and at one end auxiliary wheels adapted to cooperate with the main wheels; and
- a material handling adapter releasably attached by the interconnection assembly to the cart.

8. A multimode cart according to claim 7, further comprising;
- a detachable nose rail formed form a generally U-shaped rail adapted to attach to the base assembly.

9. A multimode cart according to claim 7, wherein the interconnection assembly further includes a plurality of clips and attachment recesses disposed about the base assembly and adapted to releasably engage the material handling adapter.

10. A multimode cart according to claim 7, wherein the interconnection assembly further includes a plurality of clips and attachment recesses disposed about the base assembly and adapted to releasably engage the material handling adapter.

11. A multimode cart for transporting items across a surface, comprising;
- a substantially rigid and generally planar frame formed with a handle and oppositely disposed main wheels;
- a brake assembly attached to the frame proximate to the wheels that includes at least one actuable friction pad adapted to engage at least one of the main wheels to, when actuated, prevent rotation thereof;
- a capture device slidably carried by the base assembly and adapted to releasbly latch to the frame when in the nested position;
- wherein the capture device further incorporates a handle at one end and an opposite latch and wherein the frame further incorporates a grapple adapted to be captured by the latch to retain the base assembly in the nested position relative to the frame;
- a generally planar base assembly connected to the frame by an articulation assembly and adapted to move between a nested position substantially coplanar with the frame and an extended position generally orthogonal with the frame, the base assembly including an interconnection assembly disposed about the base assembly and auxiliary wheels adapted to cooperate with the main wheels; and
- a material handling adapter releasably attached by the interconnection assembly to the cart.

12. A multimode cart according to claim 7, further comprising:
- a detachable nose rail formed from a generally U-shaped rail adapted to attach to the base assembly.

* * * * *